UNITED STATES PATENT OFFICE.

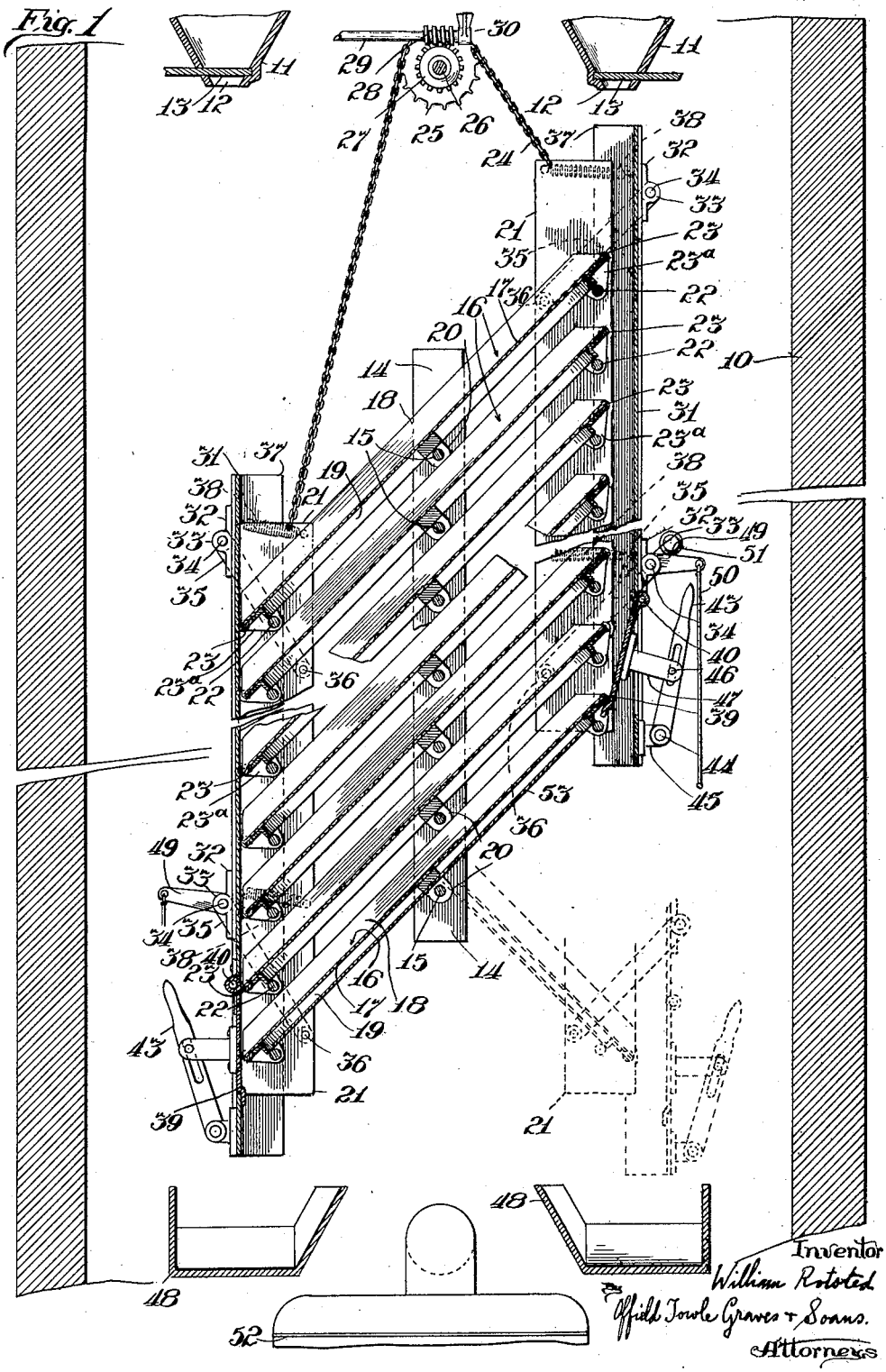

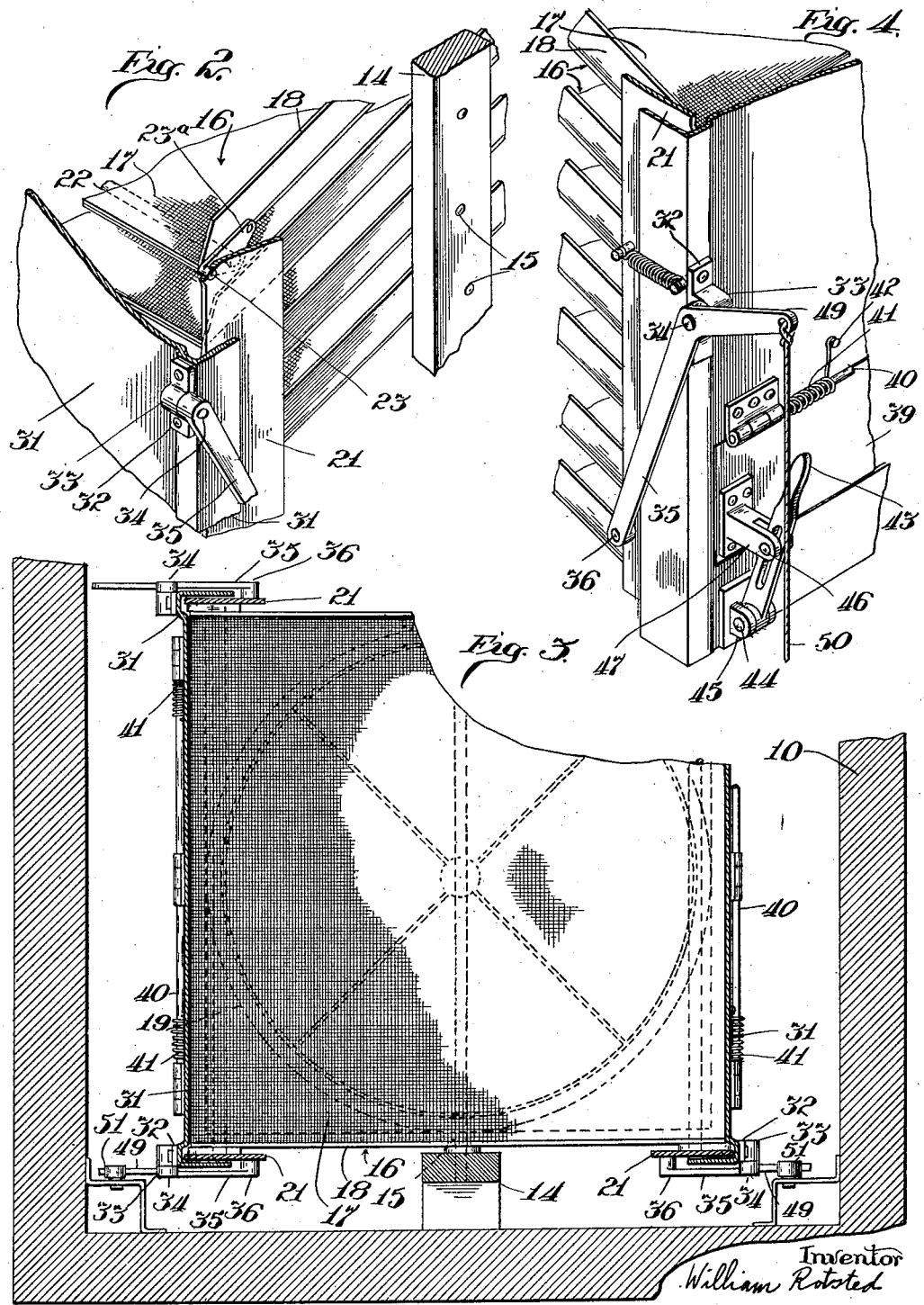

WILLIAM ROTSTED, OF CHICAGO, ILLINOIS.

APPARATUS FOR TREATING GRAIN, &c.

1,399,797.	Specification of Letters Patent.	Patented Dec. 13, 1921.

Application filed June 10, 1918. Serial No. 239,149.

*To all whom it may concern:*

Be it known that I, WILLIAM ROTSTED, a citizen of the United States, residing at Chicago, in the county of Cook and State of Illinois, have invented certain new and useful Improvements in Apparatus for Treating Grain, &c., of which the following is a specification.

My invention relates to improvements in apparatus for drying, heating, or otherwise treating grain, fruits, vegetables, or other products which may be handled in bulk form. The invention, although capable of many different applications, will be found particularly suitable in connection with the germination of grains, the drying of grains, and for evaporating the moisture out of suitably prepared fruits and vegetables.

The object of the invention is to provide a simple, inexpensive, and efficient apparatus of the character described, in which the treatment of the material may be effected rapidly and economically, with a minimum expenditure of fuel, labor, supervision, repairs, maintenance, and other charges. The particular features by which the objects of the invention are attained will be hereafter referred to in the description and appended claims.

In the drawings accompanying this application, which illustrate a specific embodiment of my invention as applied to the drying of small grains—

Figure 1 is a vertical section through the apparatus;

Fig. 2 is a fragmentary perspective view of a portion of the apparatus shown in Fig. 1;

Fig. 3 is a sectional plan view of the apparatus shown in Fig. 1; and

Fig. 4 is a fragmentary perspective view of a portion of the apparatus employed for automatically controlling the position of certain parts of the apparatus.

Referring to the drawings, 10 represents an elongated vertical inclosure, constructed of brick or other suitable material which is an efficient non-conductor of heat, such inclosure constituting a flue or shaft up and through which is circulated heated air or other gas for drying the grain supported within the flue. At the top of the inclosure there is positioned, adjacent each wall of the flue, a trough or hopper 11 for receiving the grain which is to be dried, said trough or hopper converging toward the bottom and having at its lower end an opening 12 extending along the length of the trough. Said opening 12 is normally closed by a suitable gate or valve 13 which may be opened or closed to control the flow of grain out of the hopper.

Centrally located on opposite walls of the flue and rigidly secured thereto is a vertically extending member 14, in which members 14 there are mounted a series of vertically spaced stationary rods 15. The rods 15 constitute pivots for the tilting frames or trays 16, said trays 16 being capable of oscillatory movement upon said pivot rods 15 so that they may be inclined at a comparatively steep angle in either direction. Each of the said trays 16 comprises a screen 17, the side guards 18 extending along the sides of the screen 17 and a spider or under-frame 19 constructed of light strong material for supporting the screen and for maintaining the shape of the screen and frame 16 as a whole. The depending lugs 20, secured to and forming integral parts of the said frame 16, form the pivotal mountings upon which the frame 16 may be oscillated upon the stationary pivot rods 15.

The various trays 16 are caused to tilt or oscillate in unison by means of a set of four link members 21 extending vertically at the corners of the tilting frames 16 and pivoted thereto by means of studs 23 on the ends of the small brackets 23ª secured to the outer corners of the trays and tie-rods 22, said studs 23 being journaled in apertures drilled in the vertical link members 21.

To the upper ends of the said link members 21 I preferably attach the respective ends of a chain or cord 24, there being preferably a pair of said cords or chains for each side of the aperture. The said chains 24 pass over a pair of suitable sprockets or pulleys 25 keyed to the ends of a horizontal shaft 26, the extremities of which are suitably journaled in opposite side walls of the inclosure 10. Said shaft 26 may be rotated or oscillated by any suitable mechanism; for instance, I have illustrated a worm gear 27 keyed to the said shaft, said worm gear being actuated by a worm 28 keyed to a horizontal shaft 29 rotatably mounted in suitable fixed supports as at 30, and operated by means of a crank or by power.

Special means are provided for preventing the grain or other material from running off the ends of the screens when they are tilted or oscillated. Such means comprise a pair of rectangular end doors or gates 31 extending across the inclosure the entire width of the trays 16 and extending vertically a sufficient distance to serve the entire bank of trays. Said doors 31 are movably supported upon the link members 21, previously referred to, and move as a unit therewith when the apparatus is oscillated. While the device is being oscillated to treat the grain, the inner surfaces of said doors 31 are in engagement with the ends of the screens 17 and so prevent the grain from running off the screens. When it is desired to fill or empty the trays 16, the end gates 31 are moved outwardly from the ends of the screens 17 by mechanism to be presently described.

Secured to the outer surfaces of each of the gates 31 are a pair of small brackets 32 which have apertured lugs 33 for receiving pivot pins 34 on the ends of arms or links 35, the inner ends of which are pivoted to studs or pins 36 carried by the vertical link member 21. It will be readily understood that by swinging the said links 35 upon the vertical members 21, the gates 31 may be caused to move inwardly until the inner surfaces of the said gates 31 engage the horizontal lips or edges of the screens 17. Hence, it will be apparent that when the links 35 have been moved into the proper position, the gates 31 effectively prevent passage of material off the ends of the screens when the latter are tilted. The gate members 31 have the additional function of serving as chutes for filling the trays with the untreated material; and in this connection, reference may be had to Fig. 1 which shows the apparatus in condition for filling with grain. The particular gate member 31 which then occupies the up position is moved outwardly, as shown, so as to leave a space between its inner surface and the upper horizontal edges of the tilting trays, there being thus provided a narrow vertically extending passageway through which grain may be fed in order to charge the trays. It will be observed that in order to prevent grain from passing out sidewise at the corners of the screens, each of the said gate members 31 is flanged at each side, as shown at 37.

The gate members 31 are normally held in engagement with the front and rear edges of the trays or screens 17 by means of a plurality of tension springs 38, the ends of which are connected respectively to the gate members 31 and the vertical link members 21. During the time that the trays are being filled, the bottom end of the chute formed by moving the gate member outwardly, is closed by means of a valve member 39 which comprises a plate extending along the edge of the bottom screen 17 and having its upper end pivoted on a pivot rod 40 horizontally mounted in the gate member 31. Said gate valve 39 is normally held in engagement, as to its lower end, with the edge of the bottom screen 17, by means of a spring 41 connected between the said valve member 39 and a pin 42 mounted on the link member 21. Said spring 41 is operative to hold the gate valve 39 closed, both when the gate member 31 is closed or open, and may be opened at will by means of a hand-lever 43.

The hand-lever 43 for controlling the gate valve 41 has its lower end pivoted on a pin 44 mounted in a small bracket 45 secured to the lower end of the chute or gate member 31. Said lever intermediate its ends is slotted, as shown at 45, in order to receive a pin 46 on the end of a small lug or bracket 47 secured to the outside of the gate valve 39. When it is desired to open the gate member 31 in order to allow the grain to run out into the hopper or receiving trough 48, the hand lever 43 is pulled outwardly so as to simultaneously cause the gate member 31 to swing outwardly upon the pivotal arms 35 while at the same time the gate valve 39 is also moved into vertical position in line with the gate member 31 so as to allow the grain to fall into the hopper 48.

After the treated grain has been discharged, and when it is desired to re-fill the trays, the gate member 31 is moved outwardly while leaving the gate valve 39 in the position shown in Fig. 1. In order to effect such opening movement of the gate member 31 while leaving the said gate valve 39 closed, the gate member 31 is moved by means other than the handle 43. For instance, on one of the swinging arms or links 35 I may use a bell crank arm 49, the outer end of which is apertured to receive the cord or chain 50, hanging down in a convenient position to be pulled by hand when the trays are to be filled; or, if desired, I may actuate the said bell crank 49 through a fixed pivoted roller 51 by simply increasing the amplitude of the normal up and down oscillatory movement of the link member 21, thereby causing the said bell crank 49 to strike the said roller 51 and move the gate member 31 outwardly, due to the increased upward movement of the device. If desired, in place of the springs 38 and 41 for holding closed the gate members 31 and the gate valve 39, any suitable form of hand catch or locking device may be employed. In order to cause heated air for drying purposes to pass up through the flue or inclosure, I may employ any form of heating device, such as a hot air furnace or heater fragmentarily indicated at 52 in Fig. 1; and, in order to prevent excessive heating of the lower tray-full of grain, the bottom tray 16 may be equipped with a suitable protective apron, as shown at 53.

The device, as shown, may be employed for many purposes; for instance, it may be used to germinate various grains in order to render them better fitted for certain further treatment or use; it may be used for removing the moisture from many different kinds of grains so as to render them less liable to spoil when stored; and also, many varieties of vegetables and fruits may be dried or evaporated in the apparatus, the said vegetables or fruits being of course suitably cut, chopped up, or comminuted, to enable them to be fed into or out of the apparatus.

It will also be apparent that the apparatus may be employed for bleaching purposes in addition to the uses which have been heretofore enumerated. If desired at any time, the grain or other material can be passed directly through the apparatus by suitably tilting the trays and manipulating the valves or gates which control the flow of material.

In practice, the apparatus will be found to be extremely rapid, economic, and efficient, and may be operated with a minimum of labor and other expense.

The described details of the apparatus may of course be modified considerably without sacrifice of efficiency and without departing from the spirit of the invention, the scope of which should be determined by reference to the appended claims.

I claim—

1. The combination of a screen, the upper surface of which is arranged to receive moisture-bearing material, means for tilting said screen, and movable guard means hingedly connected with the outer edge of said screen for preventing material from running off the lower end of said screen when the latter is tilted.

2. The combination of a plurality of trays vertically spaced and superposed one above the other, pivotal means for causing said trays to tilt in unison about horizontal axes intermediate their ends, and means common to a plurality of trays for preventing material from running off the lower ends of said trays when the latter are tilted.

3. The combination of a plurality of substantially rectangular trays vertically spaced apart and superposed one above the other and provided with screens upon which the material may be placed for treatment, said trays being pivoted to swing in unison substantially about horizontal axes intermediate the lengths of said trays, and gates arranged to close the edges of said trays remote from and parallel with the pivotal axes.

4. The combination of a plurality of substantially rectangular trays vertically spaced apart and superposed one above the other and provided with screens upon which the material may be placed for treatment, said trays being pivoted to swing in unison substantially about horizontal axes intermediate the lengths of said trays, gates arranged to close the edges of said trays remote from and parallel with the pivotal axes, and means for opening or closing either of said gates independently at will.

5. The combination of a plurality of trays vertically spaced and superposed one above the other, said trays being mounted to tilt in unison, and a gate member adapted to prevent material from running off the edges of said trays and adapted to be moved away from the ends of said trays to constitute means for guiding material into said trays.

6. The combination of a plurality of trays vertically spaced and superposed one above the other, said trays being mounted to tilt in unison, and a gate member adapted to prevent material from running off the ends of the said trays and adapted to be moved away from the ends of said trays to constitute means for guiding material into said trays, the arrangement including means at the lower end of said gate member for preventing passage of material below the bottom tray, but operable to permit such passage when desired.

7. In a device of the class described, the combination of a plurality of superposed trays pivotally mounted to oscillate to an inclined position, a chute at one end of and communicating with each of the trays for supplying material thereto, and a chute at the other end of and adapted to receive the discharge from each of the trays.

8. In a device of the class described, the combination of a plurality of superposed trays pivotally mounted to oscillate to an inclined position, and a pair of chutes each embracing corresponding ends of the trays, and adjustable therefrom for feeding material onto the trays and discharging material therefrom.

9. In a device of the class described, the combination of a flue, a plurality of superposed trays pivotally mounted in the said flue to oscillate collectively to an inclined position, and means at the exterior of the flue for adjusting the inclination of the trays therein.

WILLIAM ROTSTED.